April 17, 1956 R. L. MAYER 2,742,530

ELECTRO-MECHANICAL PICK-UP CARTRIDGE
WITH REVERSIBLE STYLUS MOUNTING

Filed Aug. 23, 1952

INVENTOR
ROBERT L. MAYER

BY Francis J. Klempay

ATTORNEY 2,742,530
Patented Apr. 17, 1956

1

2,742,530

ELECTRO-MECHANICAL PICK-UP CARTRIDGE WITH REVERSIBLE STYLUS MOUNTING

Robert L. Mayer, Conneaut, Ohio, assignor to The Astatic Corporation, Conneaut, Ohio, a corporation of Ohio Application August 23, 1952, Serial No. 305,970

7 Claims. (Cl. 179—100.41)

The present invention relates to improvements in electro-mechanical phonograph pick-up cartridges, particularly of the type utilizing piezoelectric transducing elements, and has particular reference to improvements in pick-up cartridges for selective use with recording discs of the conventional and micro-groove types.

More specifically the invention seeks to improve heretofore known and approved pick-up cartridges of, for example, the type disclosed and claimed in U. S. Patent No. 2,575,999, issued November 20, 1951, to John E. Cordes, entitled "Piezoelectric Phonograph Pickup," the improvements being desired for the purpose of adapting cartridges of the type disclosed in the above mentioned patent for universal use in incompatible conventional and micro-groove sound recording and reproducing systems.

The ultimate object of the invention is the provision of a piezoelectric pick-up cartridge assembly having a plurality of selectively usable record groove engaging styli wherein a member directly mounting the styli may be manipulated independently of the piezoelectric member associated therewith or of the cartridge body proper to present a selected stylus tip for record engagement. Heretofore it has been proposed to utilize for muliple styli operation a cartridge and piezoelectric member having a plurality of divergently related styli extending in fixed directions from the cartridge whereby upon appropriate manipulation of the cartridge assembly as a whole a selected one of the plurality of styli could be presented for record engagement. My present construction obviates certain difficulties and disadvantages inherent in the prior devices by providing for manipulation of as little of the cartridge assembly as practicable, permitting the cartridge body and delicate piezoelectric crystal to be at all times rigidly secured to the tone arm of the phonograph apparatus.

A more specific object of the invention is the provision of a universally usable pick-up cartridge assembly utilizing a combined stylus tip mounting and crystal driving member which is rotatable with respect to the cartridge whereby a plurality of stylus tips arranged in divergent relation to the mounting member therefor may be selectively brought into a predetermined position wherein the selected stylus projects operatively from the cartridge casing for engagement with a record groove.

Yet another object of the invention is the provision of a pick-up cartridge having the above mentioned characteristics wherein journal means are provided in the cartridge assembly for rotatably supporting the stylus tip mounting member and wherein such journal means includes the piezoelectric transducing element of the pick-up apparatus. The present arrangement provides that while the stylus tip mounting member may be rotated within the cartridge assembly to present one of a plurality of tips

2 in record engaging position the operative relation of the mounting member to the piezoelectric crystal element remains at all times unchanged whereby consistent and accurately predictable sound reproduction is possible.

A further object of the invention is the provision in a pick-up cartridge of the type having a rotatable stylus mounting member as above mentioned of means for securing the stylus mounting member at or near one end thereof with its free end projecting forwardly in accordance with preferred construction, and of means positioned at the forward end of the cartridge assembly for rotating the securing means to thereby rotate the stylus mounting member about its axis to selectively present one of a plurality of stylus tips for record engagement.

A still further object of the invention resides in the provision of a pick-up cartridge assembly having the qualities and characteristics set forth above which is simple and economical to construct and therefore adapted to be produced in large quantities.

The above and other objects and advantages of my invention will become apparent upon full consideration of the following detailed specification and accompanying drawing wherein is disclosed a certain preferred embodiment of the invention.

Figures 1, 2, 3, 4, 5:
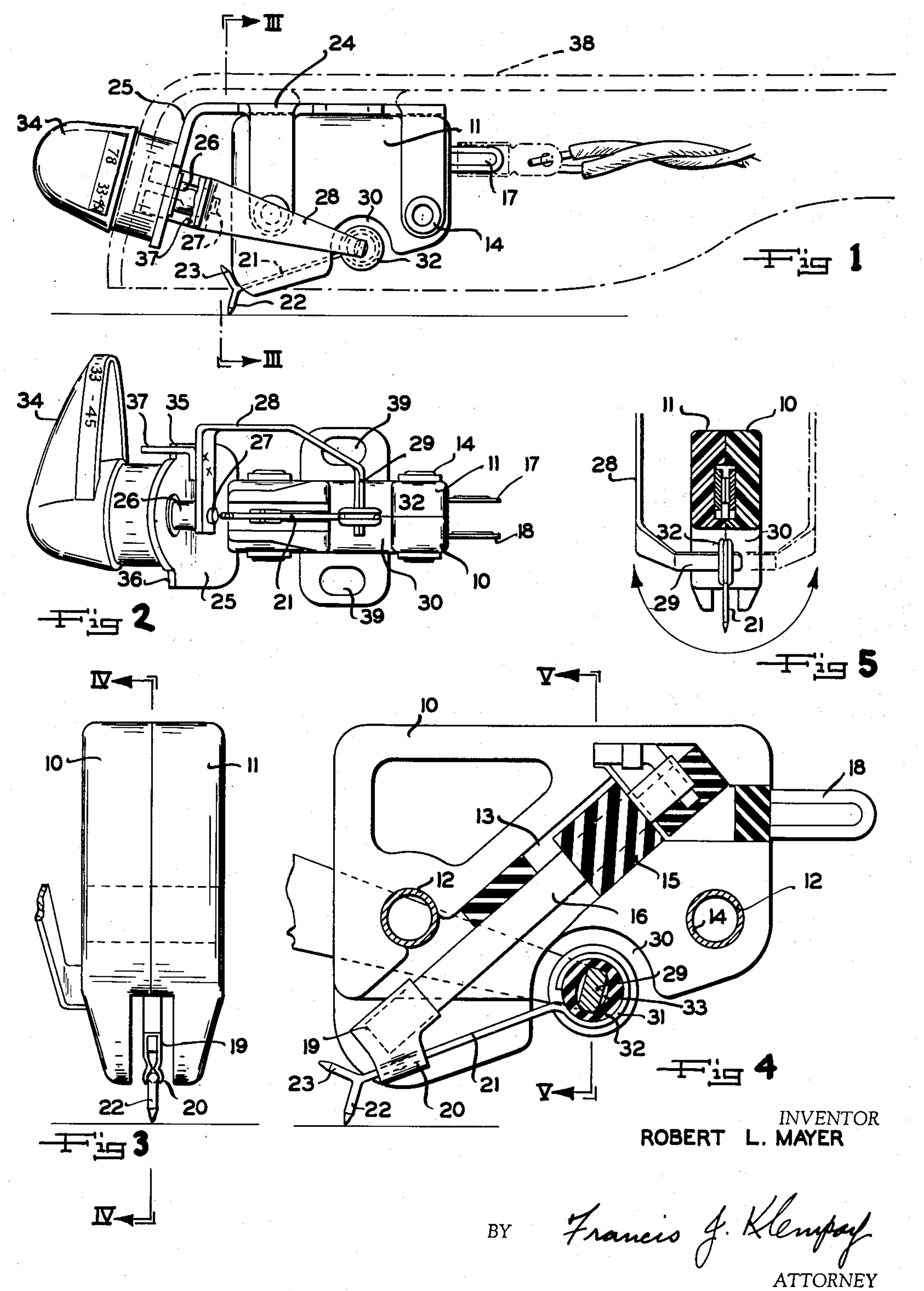
Figure 1 is a side elevation of an assembled pick-up cartridge constructed in accordance with the principles of my invention, the cartridge being illustrated as assembled in the outer free end of a conventional phonograph tone arm.
Figure 2 is a bottom plan view of the cartridge assembly of Figure 1.
Figure 3 is an enlarged section view taken generally along line III—III of Figure 1.
Figure 4 is a section view taken along line IV—IV of Figure 3.
Figure 5 is a fragmentary section view of my cartridge assembly taken generally along line V—V of Figure 4.

Referring initially to Figures 3 and 4 of the drawing, the numerals 10 and 11 designate opposed cartridge casing sections which are preferably of molded plastic construction and which are provided with spaced transverse apertures 12 and diagonally extending recesses 13. The recesses 13 are so disposed that upon the casing sections 10 and 11 being joined and secured by suitable rivets 14 the recesses 13 define a diagonally extending rectangular opening in the cartridge casing.

In accordance with certain principles disclosed in the above mentioned U. S. Patent No. 2,575,999, I secure in the diagonally extending opening, by means of suitable resilient clamping blocks 15, an elongated piezoelectric crystal element 16 which is preferably of the ceramic type utilizing, for example, a pair of polarized barium titanite slabs laminated on opposite sides of a neutral member. Also in accordance with heretofore known construction, a pair of terminal members 17 and 18 are carried by the casing sections 10 and 11 at the upper end thereof, the terminals 17 and 18 being in contact with opposite sides of the piezoelectric element 16 at the upper end thereof whereby upon the lower or free end of the element 16 being flexed an electric potential will be developed across the terminal members 17 and 18.

Secured to the lower or free end of the piezoelectric element 16 is a coupling member 19 having oppositely disposed downwardly depending resilient clamping portions 20 defining a generally cylindrical recess, the axis of which is disposed angularly to the diagonally disposed axis of the piezoelectric element 16 as is illustrated in Figure 4.

Rotatably but frictionally retained between the clamping sections 20 is an elongated rod or wire 21 which mounts at its outer end a pair of divergently related stylus tips 22 and 23, one of which is preferably of the conventional or three mil size while the other is suitable for use in micro-groove systems, having a tip radius in the order of one mil.

In accordance with the teachings of prior U. S. Patent No. 2,575,999, to Cordes, the rear end of the stylus mounting member 21 is fixed at a point substantially removed from the coupling member 19 whereby the member 21 may readily flex in a side-to-side direction as the operative stylus 22 or 23 tracks the lateral undulations of a record groove. The side-to-side motion thus imparted to the stylus mounting member 21 is transmitted to the free end of the piezoelectric element 16 through the coupling member 19, whereupon an electric potential, proportional at all times to the lateral displacement of the stylus tip 22 or 23, is developed at the terminals 17 and 18. The terminal potential developed in this manner may be amplified and reproduced in the form of an audible signal by any of various well-known arrangements.

In order to provide for the selective presentation of either of the styli 22 or 23 in operative record-engaging position I prefer, in accordance with the teachings of the present invention, to merely rotate the stylus mounting member 21 about its principal axis. This I have accomplished by providing a normally fixed mounting for the rear end of the stylus mounting member 21, which normally fixed mounting may be rotated with respect to the principal cartridge body so that in turn the member 21 may be rotated to present one or the other of the styli 22 or 23 in operative position.

In the illustrated embodiment of the invention the mounting means for the member 21 comprises a bracket 24 which is rigidly secured to the cartridge body by the rivets 14 and which has a downwardly depending portion 25 positioned forwardly of the cartridge body, preferably in angular relation thereto as shown in Figure 1. The forwardly extending portion 25 is provided with a journal portion 26 adapted to receive and rotatably retain a shaft 27. Rigidly secured to the shaft 27 at its inner end portion is a U-shaped member 28 having a free transverse reach 29 extending partially through the cartridge casing at a recessed portion 30 thereof and intersecting the principal axis of the stylus mounting member 21 as shown in Figures 1 and 2. The transverse reach 29, in accordance with the teachings of the invention, serves as a normally fixed mount for the member 21, and for this purpose the rearward end of the stylus mounting member 21 is provided with a circular eye 31 which is adapted to be rotatably retained in an annularly recessed resilient grommet 32. The grommet 32 is provided with a central aperture 33 which is slightly smaller than the transverse portion 29 of the U-shaped bracket, and hence, when the grommet is applied over the free end of the transverse portion 29 the grommet is frictionally retained in its applied position while the stylus mounting member 21 is free to rotate about the transverse portion 29 by rotating relative to the grommet 32 in the annular groove thereof. Preferably, however, the resilient grommet 32 provides a slight frictional resistance to relative rotation of the stylus mounting member 21.

In accordance with the present invention, the shaft 27 which carries U-shaped bracket 28 at its inner end, is provided with a suitable control knob 34 at its outer end whereby the bracket 28 may be rotated about the axis of the shaft 27 between two operative positions. By locating the grommet 32 appropriately on the transverse portion 29 of the U-shaped bracket, i. e., so that the axes of the shaft 27 and stylus mounting member 21 intersect, I provide that rotation of the control knob 34 through an angle of 180°, for example, will cause the stylus mounting member 21 to rotate about its axis through a similar arc whereby the operative and inoperative styli 22 and 23 respectively may be interchanged to adapt the pick-up apparatus for use in a different recording system. It will be understood that the U-shaped bracket 28 merely swings from one side to the other of the cartridge casing when the knob 34 is rotated through 180°, the bracket 28 being so dimensioned as to clear the lower side of the casing during the traverse from one operative position to another.

Also in accordance with the teachings of the invention, the resilient clamping portions 20 of the coupling member 19 are arranged to firmly grip the stylus mounting member 21 at all times while permitting the same to be readily rotated about its principal axis. Thus, as the knob 34 and bracket 28 are moved between operative positions the stylus mounting member 21 is retained in proper orientation with respect to the piezoelectric element 16 and is caused to rotate about the annularly grooved grommet 32 in the manner desired. Alternatively the member 21 and grommet 32 may be caused to rotate as a unit about the transverse portion 29. The illustrated arrangement is preferred however.

To assure proper positioning of the styli 22 and 23 when the same are rotated from one operative position to another I have provided means comprising a pair of diametrically opposed shoulders 35 and 36 on the depending portion 25 of mounting bracket 24 and an arm 37 extending from the U-shaped member 28 whereby upon the U-shaped member 28 being moved into an operative position the arm 37 will engage one or the other of the shoulders 35 or 36 to prevent further movement of the styli. Friction inherent in the apparatus is usually sufficient to maintain the parts in a set operative position. Otherwise any suitable detent means or overcentering spring means may be utilized for the purpose.

If desired, a worn-out stylus may be readily replaced by merely slipping the resilient grommet 32 off of the U-shaped bracket 28 and removing the stylus mounting member 21 from the resilient clamping members 20, whereupon a new stylus mounting member, assembled with a resilient grommet, may be replaced in the assembly.

As indicated in Figure 1 of the drawing the entire cartridge assembly may be inserted in the end of a tone arm 38 and held therein by suitable screws, not shown, or other devices which engage the mounting bracket 24 through apertures 39 provided therein. A slot, not shown, may be provided in the end wall of the tone arm 38 whereby the cartridge assembly may be readily slipped into and out of the arm, or, if desired, the knob 34 may be disengaged from the shaft 27 for assembly of the cartridge into the arm, whereupon the knob may be reapplied to the shaft 27 through a suitable aperture, not shown, provided in the arm 38.

It is also contemplated that the knob 34 will be provided with suitable indicia whereby an operator may readily ascertain which of a plurality of styli is in operative position by visual reference to the knob 34 from a control position above the same.

Pick-up cartridge assemblies constructed in accordance with my invention are thought to be more sound than assemblies heretofore proposed for the same purpose in that the principal cartridge body and delicate piezoelectric crystal element may be permanently and rigidly mounted in the tone arm while a plurality of styli may be manipulated relative to the permanently mounted members to present a selected stylus for record engagement. Simpler and more flexible mounting arrangements are thereby afforded, and in general the present assemblies of the type wherein the entire cartridge assembly is adjustably mounted in the tone arm.

The apparatus specifically disclosed herein is thought to be particularly advantageous in that it provides for the adaptation of a cartridge structure of known advantageous construction for use in multi-speed phonograph apparatus. Thus, in the present apparatus certain of the predominant and desirable features of the apparatus disclosed in U. S. Patent No. 2,575,999 are retained while adapting the same for use in incompatible micro-groove and conventional recording systems.

It should be understood, however, that the presently described embodiment of the invention is illustrative only, and reference should therefore be had to the appended claims in determining the full scope of the invention.

I claim:

1. A pick-up cartridge assembly for electric phonograph apparatus comprising in combination a casing adapted to be secured in the outer free end of a phonograph tone arm, a piezoelectric transducer mounted in said casing and having a fixed and free end, a coupling member secured to and carried by said transducer at its free end, an elongated stylus mounting member journaled at its outer end portion by said coupling member and adapted for rotation about its principal axis, said stylus mounting member carrying at its outer end a plurality of divergently related record groove engaging styli, normally fixed but rotatable means carried by said casing and connecting said stylus mounting member at its inner end, said rotatable means being operative to rotate said stylus mounting member about its principal axis and relative to said coupling member to selectively position any of said plurality of styli in record engaging position, said rotatable means comprising a U-shaped member disposed transversely of said stylus mounting member and mounted for rotation about an axis intersecting the axis of said stylus mounting member, said U-shaped member being rotatably supported by one transverse reach and being connected to said stylus mounting member by the other transverse reach, and said U-shaped member being rotatable about said casing from one side to the other thereof.

2. A pick-up cartridge assembly for electric phonograph apparatus comprising in combination a casing adapted to be secured in the outer free end of a phonograph tone arm, a piezoelectric transducer mounted in said casing and having a fixed and a free end, a coupling member secured to and carried by said transducer at its free end, an elongated stylus mounting member journaled at its outer end portion by said coupling member and adapted for rotation about its principal axis, said stylus mounting member carrying at its outer end a plurality of divergently related record groove engaging styli, normally fixed but rotatable means carried by said casing and connecting said stylus mounting member at its inner end, said rotatable means being operative to rotate said stylus mounting member about its principal axis and relative to said coupling member to selectively position any of said plurality of styli in record engaging position, said rotatable means comprising a transversely disposed member rotatable about an axis intersecting the axis of said stylus mounting member, and means spaced laterally of said casing and connecting said transversely disposed member for effecting rotation thereof.

3. Apparatus according to claim 2 further characterized by said stylus mounting member being provided at its inner end with an eye, and further including a resilient annularly recessed and centrally apertured grommet positioned in said eye, said grommet being adapted to be frictionally retained on said transverse member and said stylus mounting member being rotatable about said grommet in said annular recess.

4. A pick-up cartridge assembly for electric phonograph apparatus comprising in combination a casing adapted to be secured in the outer free end of a phonograph tone arm, a piezoelectric transducer mounted in said casing and having a freely disposed portion adapted to be flexed for the generation of electric potential, a coupling member secured to and carried by said freely disposed portion, a stylus mounting journaled by said coupling member and adapted for rotation about its principal axis, said stylus mounting member carrying a plurality of divergently related record groove engaging styli, normally fixed but rotatable means for anchoring said stylus mounting member at a point spaced from said coupling member, said rotatable means being operative to rotate said stylus mounting member about its principal axis and relative to said coupling member to selectively position any of said plurality of styli in record engaging position, said stylus mounting member being anchored near its inner end, said rotatable means including a rotatable control member positioned adjacent the outer end of said stylus mounting member, and said rotatable means further including a U-shaped member connecting said control member and said stylus mounting member and adapted to be rotated about said casing.

5. A pick-up cartridge assembly for electrical phonograph apparatus comprising in combination a casing adapted to be secured in the outer free end on a phonograph tone arm, a piezoelectric transducer mounted in said casing and having a freely disposed portion adapted to be flexed for the generation of an electrical potential, a coupling member secured to and carried by said freely disposed portion, said coupling member including a journal portion positioned closely adjacent said freely disposed portion, a stylus mounting member rotatably carried by said journal portion, said stylus mounting member carrying a plurality of divergently related record groove engaging styli, means for anchoring said stylus mounting member at a point spaced from said journal portion, means for rotating said stylus mounting member about its axis in said journal portion to selectively position any of said plurality of styli in record engaging position, said anchor means being positioned rearwardly of said journal portion, said means for rotating said stylus mounting member including a control member positioned forwardly of said journal portion adjacent the forward end of said casing, said control member being adapted to project forwardly from said tone arm.

6. A pick-up cartridge assembly for electric phonograph apparatus comprising in combination a casing adapted to be secured in the outer free end of a phonograph tone arm, a piezoelectric transducer mounted in said casing and having a freely disposed portion adapted to be flexed for the generation of an electric potential, a coupling member secured to and carried by said freely disposed portion, said coupling member including a journal portion positioned closely adjacent said freely disposed portion, a stylus mounting member rotatably carried by said journal portion, said stylus mounting member carrying a plurality of divergently related record groove engaging styli, means for anchoring said stylus mounting member at a point spaced from said journal portion, means for rotating said stylus mounting member about its axis in said journal portion to selectively position any of said plurality of styli in record engaging position, said means for rotating said stylus mounting member comprising a member disposed transversely of and engaging said stylus mounting member whereby upon arcuate movement of said transversely disposed member said stylus mounting member will be caused to rotate about its principal axis, and means adapted to project outwardly of said tone arm and engageable externally thereof for operating said transversely disposed member.

7. A pick-up cartridge assembly for electric phonograph apparatus comprising in combination a casing adapted to be secured in the outer free end on a phonograph tone arm, a transducer mounted in said casing adapted to be flexed for the generation of electric potential, a coupling means secured to and carried by said transducer, said coupling means including a journal portion positioned closely adjacent to said transducer, a stylus mounting means carried by said coupling means, said stylus mounting means carrying a plurality of divergently related record groove engaging styli, means for anchoring said stylus mounting member, means for rotating said stylus mounting means to selectively position any of said plurality of styli in record engaging position, said anchoring means being positioned rearwardly of said journal position, said means for rotating said stylus mounting means including a control means positioned forwardly of said journal portion adjacent the forward end of said casing, and said control means being adapted to project forwardly from said tone arm.

References Cited in the file of this patent

UNITED STATES PATENTS

| | | |
|---|---|---|
| 1,465,239 | Machling | Aug. 14, 1923 |
| 2,554,209 | Miner et al. | May 22, 1951 |
| 2,575,999 | Cordes | Nov. 20, 1951 |